(12) United States Patent
Norman

(10) Patent No.: US 11,100,437 B2
(45) Date of Patent: Aug. 24, 2021

(54) METHOD FOR IMPROVING SEMICONDUCTOR BACK-END FACTORIES

(71) Applicant: Applied Materials, Inc., Santa Clara, CA (US)

(72) Inventor: David Everton Norman, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 69 days.

(21) Appl. No.: 15/976,550

(22) Filed: May 10, 2018

(65) Prior Publication Data

US 2019/0347593 A1   Nov. 14, 2019

(51) Int. Cl.
*G06Q 10/06* (2012.01)
(52) U.S. Cl.
CPC ..... *G06Q 10/06311* (2013.01); *G06Q 10/067* (2013.01)
(58) Field of Classification Search
None
See application file for complete search history.

(56) References Cited

U.S. PATENT DOCUMENTS

| 7,306,696 | B2 | 12/2007 | Lian et al. | |
|---|---|---|---|---|
| 2005/0096770 | A1* | 5/2005 | Chua | G05B 19/41865 700/102 |
| 2009/0171492 | A1* | 7/2009 | Qu | G06Q 10/06 700/101 |
| 2015/0324211 | A1 | 11/2015 | Kuroda et al. | |
| 2016/0026959 | A1 | 1/2016 | Leber | |

FOREIGN PATENT DOCUMENTS

WO   2017194129 A1   11/2017

OTHER PUBLICATIONS

Yang Song et al., "Bottleneck Station Scheduling in Semiconductor Assembly and Test Manufacturing Using Ant Colony Optimization", IEEE Transactions on Automation Science and Engineering, Oct. 8, 2007, vol. 4, Issue 4, pp. 569-578 (Year: 2007).*
International Search Report and Written Opinion for PCT/US2019/022800 dated Jul. 4, 2019.
Yang, Song, et al., "Bottleneck Station Scheduling in Semiconductor Assembly and Test Manufacturing Using Any Colony Optimizations", IEEE Transactions on Automation Science and Engineering, Oct. 8, 2007, vol. 4, Issue 4, pp. 569-578.

* cited by examiner

*Primary Examiner* — Cory W Eskridge
(74) *Attorney, Agent, or Firm* — Patterson + Sheridan, LLP

(57) ABSTRACT

Embodiments presented herein provide techniques for planning and scheduling a semiconductor back end factory. The technique begins by running a first mathematical programming model applied to factory data and production targets that produces a solution and processing the solution to produce a bottleneck loading plan for at least one machine of the factory's bottleneck machine families. The technique further includes running a second mathematical programing model applied to the bottleneck loading plan that produces a solution and processing the solution to produce a conversion schedule for the at least one machine of the bottleneck machine families. The technique further includes creating a lot schedule for the factory by running a simulation that follows the conversion schedule. The technique further includes publishing the lot schedule.

17 Claims, 3 Drawing Sheets

METHOD FOR IMPROVING SEMICONDUCTOR BACK-END FACTORIES

BACKGROUND

Field

Embodiments of the present disclosure generally relate to improving operations for a back-end semiconductor factory, and more particularly to techniques for controlling a scheduling system for a back-end semiconductor factory.

Description of the Related Art

Manufacturing facilities across many different industries are responsible for producing products that are used in every facet of life. In the case of semiconductor manufacturing, for example, semiconductor manufacturing facilities manufacture products such as microprocessors, memory chips, microcontrollers, and other semiconductor devices that have a ubiquitous presence in everyday life. These semiconductor devices are used in a wide variety of applications, examples of which include automobiles, computers, home appliances, cellular phones, and many more. In recent years, both the number of applications and demand for devices (including semiconductor devices) has steadily increased. This increased demand has led manufacturing facilities to become increasingly conscious of increasing product variety and reducing delivery times.

Each manufacturing environment is unique and extremely complex, often requiring immense amounts of capital for the necessary equipment, tools, facilities, etc. Because manufacturing is so capital intensive, even small increases in factory performance (e.g., such as building to demand, shortening order to delivery time, etc.) can have large effects on financial performance (e.g., by reducing cost through leaner manufacturing, freeing up capital tied to idle inventory, etc.). For this reason, many manufacturing facilities have implemented planning systems in their facilities to ensure the complex plan for products are providing for on-time deliveries.

In the past, semiconductor back-end factories, where products are assembled and tested, have been simple enough that they could be efficiently run without significant effort. Typically planning may be performed using simple Excel spreadsheets and schedules generated manually, if they are created at all. However this is changing rapidly. The back-end processes are becoming more complex, e.g., reentrant flows are now common, so that the simple processes that worked in the past are not capable of effectively running the factory. At the same time, advances in supply chain optimization are requiring that the factories have much stronger requirements to meet externally imposed due dates. Current processes are both not capable of efficiently running the factory, nor are they capable of meeting the new, stringent supply chain requirements.

There is a need for an improved method for planning and scheduling a factory back end.

SUMMARY

One or more embodiments presented herein may provide techniques for planning and scheduling a factory back end. The technique begins by running a first mathematical programing model applied to factory data and production targets that produces a solution and processing the solution to produce a bottleneck loading plan for at least one machine of the factory's bottleneck machine families. The technique further includes running a second mathematical programing model applied to the bottleneck loading plan that produces a solution and processing the solution to produce a conversion schedule for the at least one machine of the bottleneck machine families. The technique further includes creating a lot schedule for the factory by running a simulation that follows the conversion schedule. The technique further includes publishing the lot schedule.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
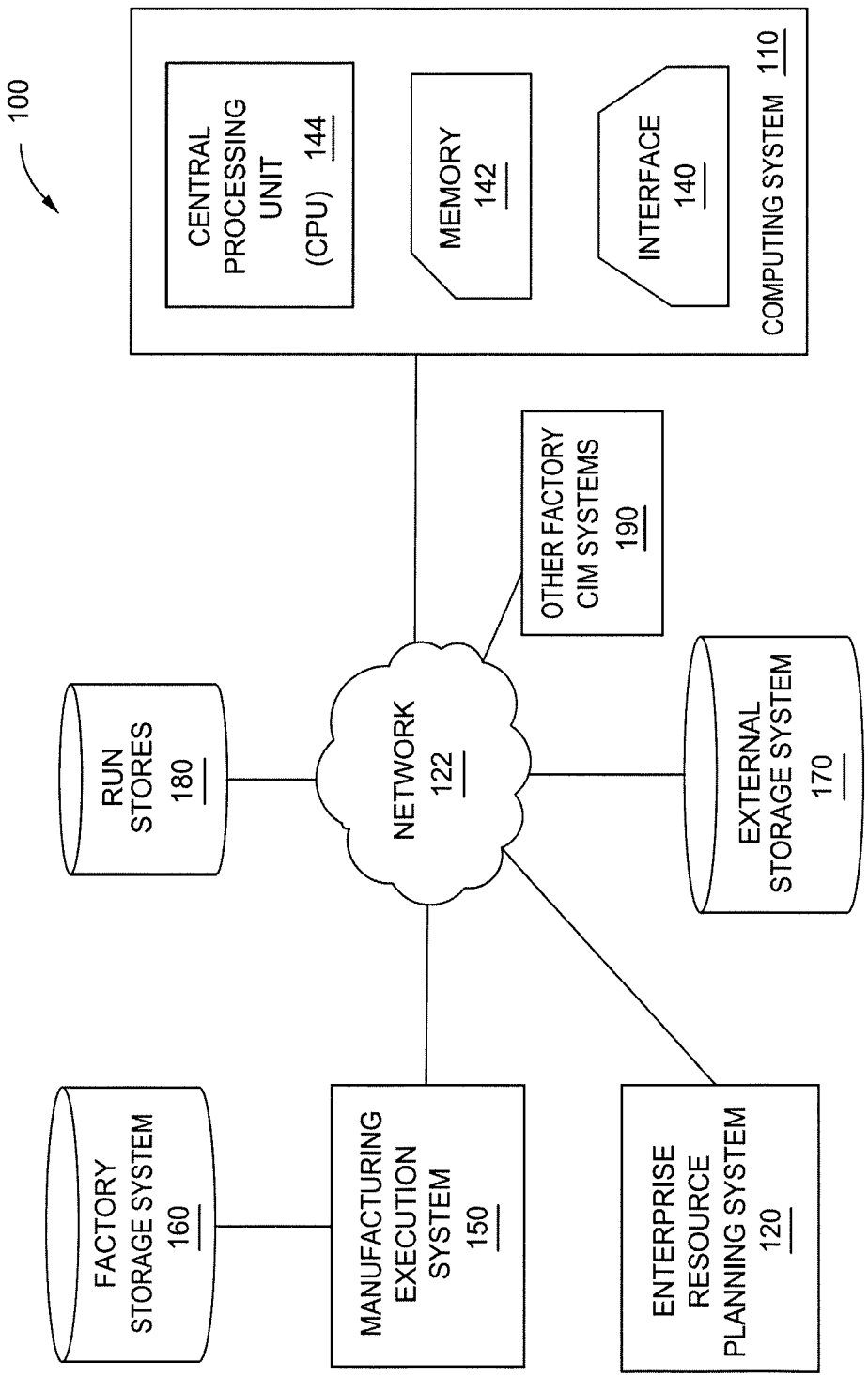
FIG. 1 illustrates a block diagram of one architecture for a manufacturing environment configured with a planning and scheduling system, in accordance with embodiments of the present disclosure.

To facilitate understanding, identical reference numerals have been used, wherever possible, to designate identical elements that are common to the Figures. Additionally, it is contemplated that elements disclosed in one embodiment may be beneficially used in other embodiments described herein without specific recitation.

DETAILED DESCRIPTION

A scheduling system is provided to plan and schedule a semiconductor back-end factory. The front-end is the part of the manufacturing where work is performed on the wafer level, whereas in back end the work is performed at chip and module levels. The front end and back end factories can be on the same or on different locations. Although embodiments of the disclosure generally relate to the back end factory, it should be appreciated by one skilled in the art that the scheduling system disclosed here is may be utilized for managing the front end factory as well. Note that, for the sake of convenience, terminology related to the manufacture of semiconductor devices is used in much of the following description as a reference example of the manufacturing production process that can be planned/scheduled using the techniques presented herein. Similarly, many of the following embodiments use back-end semiconductor manufacturing facilities as reference examples of types of manufacturing environments in which the techniques presented herein can be used to provide and implement the scheduling system.

Embodiments presented herein may include techniques for generating a lot schedule publishable to a dispatching system of the back-end factory. The lot schedule determines the time each lot processes and the machine the lot is processed on. Alternatively, the techniques generate, for each machine, a list of lots that are to be processed and when each lot is to start. To achieve this, the back-end factory planning and scheduling system employs a method using mathematical optimization to schedule semiconductor assembly and test facilities. The method breaks scheduling into three phases: creation of a bottleneck loading plan, creation of a conversion schedule identifying when machine conversions are to be performed, and creation of a lot schedule. The system creates and optimizes the bottleneck loading plan using a planning module. The planning module takes as input the demands on the factory, factory performance data, such as units per hour, machine capacity and quantity, target machine utilization, etc. The planning module creates a mathematical programming model, using for example linear programming (LP) or mixed integer programming (MIP). The model is run to generate a solution, which is processed to produce a bottleneck loading plan for each of the factory's bottleneck machine families. The plan includes what should be processed on each one of the machines in the one, two, or more families of bottleneck machines. The bottleneck loading plan specifies which products the bottleneck family (machines) should process in a given time interval. In one example, the bottleneck loading plan optimizes on-time delivery of product and minimizes the number of conversions needed. The bottleneck loading plan may optimize other key process indicators (KPIs), such as a list of preferred products to be processed on specified machines, etc. The bottleneck loading plan is fed to a conversion module that is optimized to provide on-time delivery of product and spread out conversions evenly throughout a specified time period. The conversion module creates a mathematical programming model, using for example linear programming (LP) or mixed integer programming (MIP). The model is run to generate a solution, which is processed to produce a conversion schedule for each machine including the time for each conversion and what quantity of each step of a factory process is to be processed for each conversion. This data is fed to a lot scheduling module which runs a simulation that uses the conversion schedule to create a lot schedule that is published to a factory's dispatch system.

FIG. 1 is a block diagram illustrating one architecture of a manufacturing environment (or system) 100, in which aspects of the present disclosure may be practiced. In one embodiment, the manufacturing environment 100 is an example of a semiconductor front-end or back-end manufacturing facility. As shown, the manufacturing environment 100 includes a computing system 110, manufacturing execution system (MES) 150, enterprise resource planning (ERP) system 120, factory storage system 160, external storage system 170, run stores 180 connected via a network 122, and other factory CIM systems 190 (e.g., a product life cycle management system. In general, the network 122 can be a wide area network (WAN), local area network (LAN), wireless LAN (WLAN), etc. The factory storage system 160, external storage system 170 and run stores 180, in general, can be any kind of storage system, including, for example, relational and/or hierarchal databases, distributed filing systems, network attached storage (NAS), storage-area network (SAN), etc. In one embodiment, the computing system 110, MES 150 and ERP system 120 can be any kind of physical computing system having a network interface, such as a desktop computer, laptop computer, mobile device, tablet computer, server computing systems, gateway computers, and the like.

The computing system 110 may include memory 142, central processing unit (CPU) 144, and user interface 140. The memory 142 may have data and applications stored therein. For example, the memory 142 may store planning data for use by a user. The memory 142 may also store applications such as a planning application and/or a scheduling application configured to implement one or more of the operations for running on the CPU 144. The planning application may generate plans for the manufacturing environment 100. For example, in the case of semiconductor manufacturing, a user can generate plans for determining if capacity of the manufacturing system can satisfy demands, what changes (if any) the manufacturing system should implement to meet demands, project future output of the manufacturing system, determine which products the manufacturing system produces, where the products will be produced, the amount of products to produce, run experiments to determine what operations the manufacturing system should perform, etc. The scheduling application may generate schedules for the manufacturing environment 100. For example, in the case of semiconductor manufacturing, a user can a conversion schedule for each machine including the time for each conversion and what quantity of each step of a factory process is to be processed for each conversion.

The MES 150 is generally configured to manage and control the operation of a current work-in-progress (WIP) within the manufacturing environment 100. However, it should be appreciated that other systems may be configured to manage sources of data and operations in the manufacturing environment. The plans and schedules generated on the computing system 110 may be loaded into memory, manufacturing equipment, the MES 150, or other suitable locations for organizing the demands in the plan for fulfillment by the MES 150. For a front-end semiconductor manufacturing factory, the MES 150 can control one or more processes related to the fabrication of semiconductor substrates. For a back-end semiconductor manufacturing factory, the MES 150 can control one or more processes related to cutting, assembly, and testing of semiconductor die on the substrates. The MES 150 can monitor the operation of one or more tools (or equipment) operating in the manufacturing environment 100, receive data directly from the tools, receive data from the ERP system 120, analyze data from the tools and ERP system 120, and/or collect the data. In one embodiment, the MES 150 can store the data (received from the tools) into factory storage system 160. Such information stored in the factory storage system 160 can include information regarding the current WIP, number of tools in the manufacturing environment, operating parameters (e.g., processing speeds, capacity load, and the like) of the tools, manufacturing data, and other metadata characteristic of the manufacturing environment 100.

The ERP system 120 is configured to collect, store, manage and interpret data related to resources within the manufacturing environment (e.g., amount of capital, raw materials, production capacity, etc.), current and future commitments within the manufacturing environment (e.g., orders, projected sales, delivery dates, etc.), information related to supply chain management (e.g., such as information that describes movement and storage of raw materials, WIP inventory, amount of finished goods, finances, and other information related to the flow of goods and services from supplier to ultimately the consumer), and the like. In one embodiment, some or all of this information can be stored into the factory storage system 160, ERP system 120, or other suitable storage device. The collective information regarding a quantity of parts associated with a commitment to a customer is represented by a single demand. The collective demands are organized to form the plan.

The MES 150 may be configured to contain information for planning and scheduling a factory back end. The planning and scheduling information provided by external and internal systems to plan and schedule for factory utilization ensures timely fulfilment of various customer demands. Alternatively, the planning and scheduling system may be contained in an external system or other suitable location. The demands are planned and scheduled based on commitments for fulfilment and machine utilization. The MES 150 may utilize a planning and scheduling system (item 200 in FIG. 2) to simulate and schedule factory production.

Figure 2:
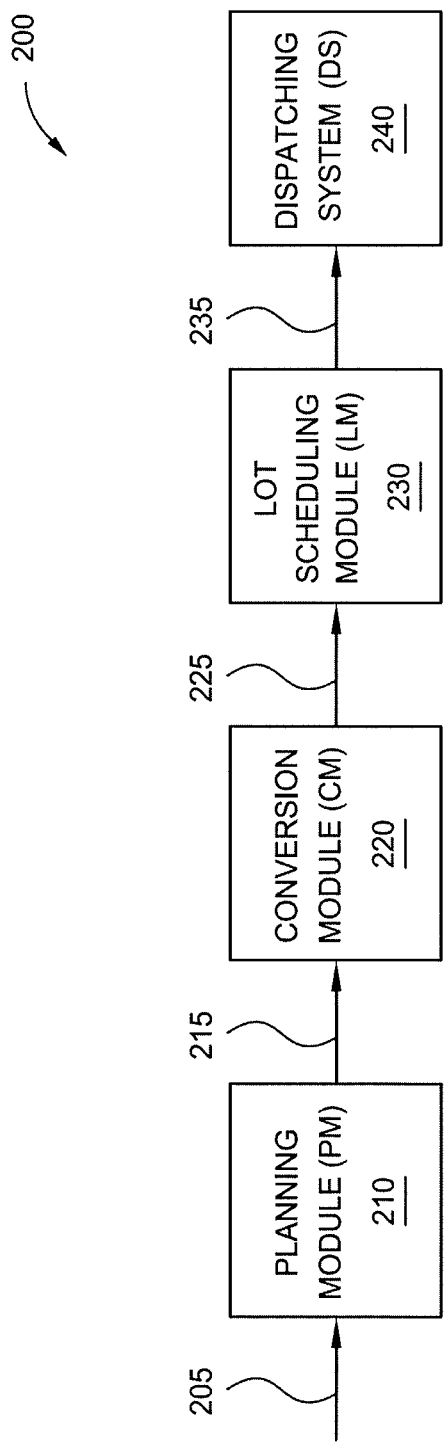
FIG. 2 is a block diagram illustrating the planning and scheduling system.

FIG. 2 is a block diagram illustrating a planning and scheduling system 200. The planning and scheduling system 200 has a planning module (PM) 210, a conversion module (CM) 220, a lot scheduling module (LM) 230, and a dispatching system (DS) 240. The PM 210, CM 220 and LM 230 may all be connected by a block-based (drag and drop) workflow engine. The internal operations of the PM 210, the CM 220, the LM 230, and the DS 240 may also employ block-based workflows. A workflow consists of an orchestrated pattern of business activity enabled by the systematic organization of resources into processes that transform materials, provide services, or process information. The workflow depicts the sequence of steps needed to create the plan, create the schedules, and publish the schedule for use manually by an operator or automatically for use by the dispatching system 240. This includes gathering data from ERP system 120, MES 150, etc., and transforming it to the format needed by the system, creating an optimization model of a plan or conversion schedule, solving it, processing the result into a plan or conversion schedule, creating a simulation model, using the conversion schedule in the simulation model, running the simulation model, processing its results into a lot schedule, and publishing the lot schedule to the dispatching system. The timing of various events, e.g., creating a new plan or schedule, is also included in the workflow. Generically, the PM 210, CM 220 and LM 230 may be connected by any suitable workflow engine.

The PM 210 determines the factory plan. The planning module 210 takes in as input factory data and production targets from a current state of the factory 205 using a block-based workflow. This data may include demands of products (e.g., customer orders of integrated circuits, wafers, modules etc.), material availability, equipment capacity, equipment output (UPH) and a host of other parameters. The current state of the factory may include at least one of a weekly plan, parameters of the factory, and works in progress (WIP). WIP includes at least one of current WIP and WIP as applied to arrivals of raw materials.

The PM 210 may develop a bottleneck loading plan 215 for optimizing equipment utilization and/or optimizing on-time delivery and other KRPs. The PM 210 may additionally prioritize demands in determining the bottleneck loading plan 215. The bottleneck loading plan 215 is a list of demands (e.g. customer orders) due at the end of specified time period. In an example, the specified time period may be a day, a few days, a week, a month, etc. The parameters of the factory include at least one of information identifying at least one bottleneck equipment group, equipment information including experiment qualifications, processing speed, routes, and conversion information. The bottleneck loading plan 215 can be configured with a block-based data processing language.

The PM 210 develops the bottleneck loading plan 215 for at least one machine of one or more bottleneck equipment families. As used herein, a bottleneck tool refers to a tool which whose performance can no longer be improved by improvements to other tools in a factory. As used herein, a loading plan refers to what the factory is to produce in a given time period (e.g., 1 day, 1 week, etc.). As used herein, a bottleneck loading plan is a plan for a given time period of what is to be produced by bottleneck tools. Equipment families refers to a set of identical or similar tools from the same manufacturer to be used for carrying out a plan in a given time period. The bottleneck loading plan 215 may look at units processed daily, shiftly, half-daily, or in other buckets of time and develop a plan for utilization of each piece of equipment. The PM 210 does not determine which families are bottlenecks, but decides, given a list of bottlenecks, what those bottlenecks should work on. The PM 210 runs a first mathematical programing model applied to factory data and production targets that produces a solution and processes the solution to produce a bottleneck loading plan 215 for at least one machine of the factory's bottleneck machine families. The mathematical programing model may be, but is not limited to, mixed integer programming MIP models, mixed integer quadratic programming MIQP models, and linear programming (LP) models. The planning module 210 may run at a frequency as conditions change in the factory. For example, equipment goes off line, orders are being fulfilled or unfulfilled or the bottleneck loading plan 215 has become stale due to age. The bottleneck loading plan 215 determines the amount of time spent in each conversion and how much of each product should be produced during each conversion. The PM 210 may output the bottleneck loading plan 215 to the CM 220.

The CM 220 follows the bottleneck loading plan. The CM 220 takes in as input the bottleneck loading plan 215 from the PM 210 and outputs a conversion schedule 225 indicative of when machine conversions are to be performed 225 in order to fulfil a conversion schedule for the at least one machine of the factory's bottleneck machine families. When machine conversions are to be performed 225 includes a time for each conversion and what quantity of each step in the production flow is to be processed before each conversion. The CM 220 runs a second mathematical programing model applied to the bottleneck loading plan 215 that produces a solution and processes the solution to produce a conversion schedule 225 for the at least one machine of the bottleneck machine families. The conversion schedule 225 includes the time for each conversion and what quantity of each step of a factory process is to be processed before each conversion. The conversion schedule 225 includes when at least one machine conversion is to be performed. The production of the conversion schedule 225 can be configured with a block-based data processing language.

The conversion schedule maximizes on-time delivery, minimizes a number of conversions, minimizes cycle time, and other KPIs. The conversion schedule may distribute conversions evenly through the specified time period. The conversion schedule is indicative of when machine conversions are to be performed in order to fulfil a conversion schedule for each machine.

The LM 230 takes the conversion schedule 225 and outputs to a lot schedule 235 for the entire factory which includes at least an identification of each machine in the factory and corresponding and start time and finish time for each lot of each machine of the entire factory for each time period. The lot schedule 235 may also split a single lot to process simultaneously on more than one machine. This splitting can be controlled using the block-based configuration of the simulation. The lot schedule 235 is fed to the dispatch system DS 240. The LM 230 creates the lot schedule 235 by running a simulation that follows the conversion schedule 225. The lot schedule 235 is indicative of the amount of each product to process on each bottleneck tool for a specified time period. The production of the lot schedule 235, e.g., picking which lot to process next on a machine, can also be configured with a block-based data processing language.

The dispatching system (DS) 240 attempts to follow detailed lot schedules 235 provide by the LM 230. The DS 240 handles exceptions such as unexpected equipment shutdown or other manufacturing interruptions such as the unavailability of raw material required in the operations. The DS 240 may provide and/or analyze real-time feedback with regard to maintaining the detailed lot schedule 235. In one example, the DS 240 may sample real-time factory data, compare the factory data with the detailed lot schedule 235 and provide ad hoc adjustments to the detailed lot schedule 235. The block-based workflow may be configured to receive events from the factory, e.g., a machine going down. When an event is received the workflow may gather factory data and based on that data regenerate or adjust the lot schedule 235. In another example, the aforementioned tasks to be performed regarding following the detailed lot schedules 235 by the DS 240 may be performed manually by a human operator.

All these operations may be performed in the workflow and is configurable by the end user. The lot schedule 235 may be automatically regenerated or re-optimized based on deviations from the existing lot schedule 235 by a certain amount or threshold. The deviations may be based on per line, per tool, or deviations across the entire fabrication environment. Incremental schedule correction, near term reordering/break-ins, detecting temporary bandwidth may additionally be performed by the DS 240. Alternately, the DS 240 may sample real-time factory data, compare the factory data with the detailed lot schedule 235 and provide notification to the LM 230. For example, the DS 240 may provide a notification to the LM 230 upon a variance in the detailed lot schedule 235 exceeding a threshold. The LM 230 provides an updated detailed lot schedule 235 to the DS 240 upon receipt of the notification.

Figure 3:
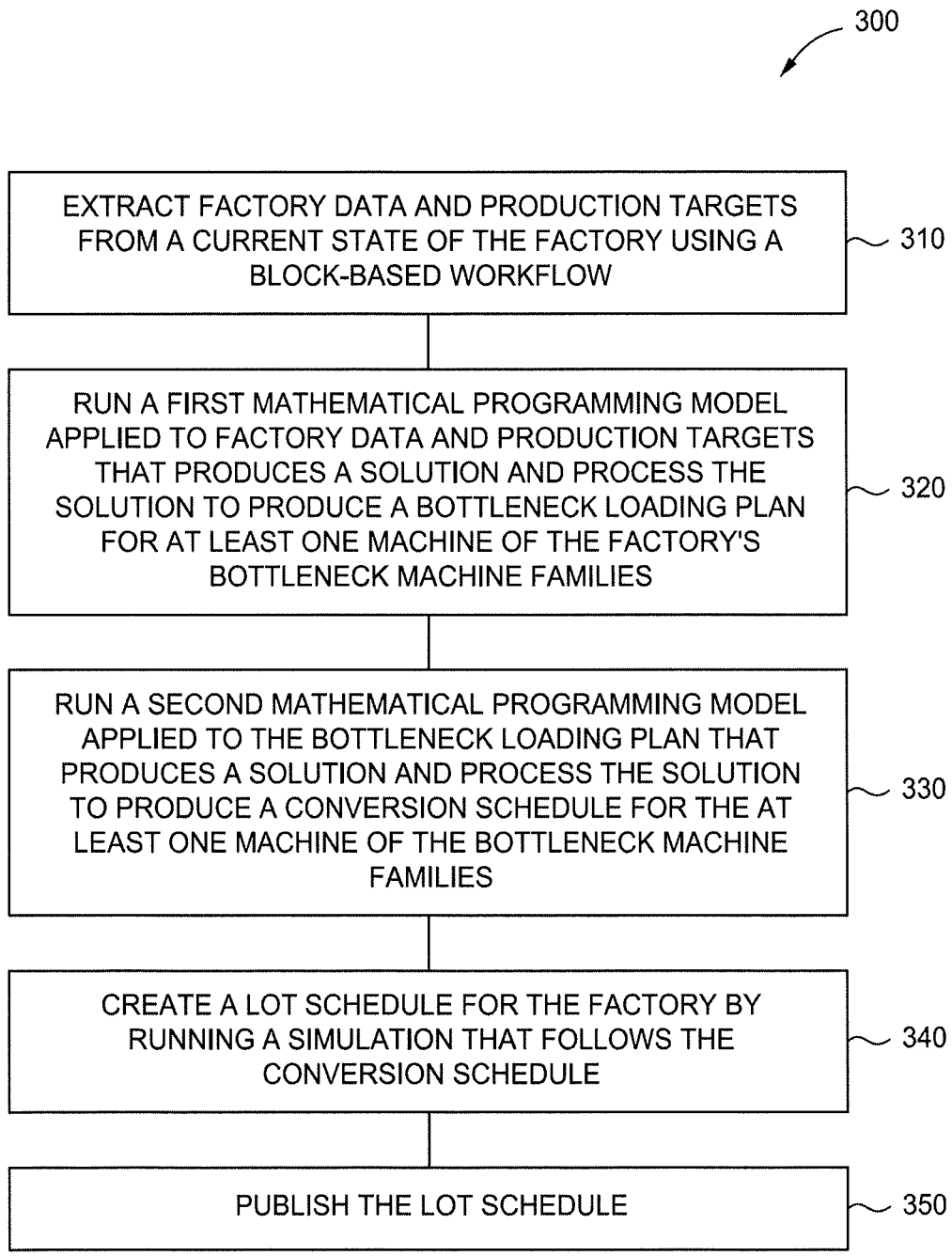
FIG. 3 is a flow diagram illustrating a method for planning and scheduling a factory back end.

FIG. 3 is a flow diagram 300 illustrating a method for planning and scheduling a factory back end. At block 310, the planning and scheduling system 200 extracts factory data and production targets 205 from a current state of the factory using a block-based workflow. The current state of the factory comprises at least one of a plan, parameters of the factory, and works in progress (WIP). WIP includes at least one of current WIP and WIP as applied to arrivals of raw materials. Parameters of the factory include at least one of identifying at least one bottleneck equipment group, equipment information including experiment qualifications, processing speed, routes, and conversion information.

At block 320, the planning and scheduling system 200 runs a first mathematical programing model applied to factory data and production targets that produces a solution and processes the solution to produce a bottleneck loading plan 215 for at least one machine of the factory's bottleneck machine families. The bottleneck loading plan 215 includes quantities processed each day. The bottleneck loading plan 215 minimizes the number of conversions by applying one or more soft constraints on the maximum number of conversions per time period.

At block 330, the planning and scheduling system 200 runs a second mathematical programing model applied to the bottleneck loading plan that produces a solution and processing the solution to produce a conversion schedule for the at least one machine of the bottleneck machine families. The conversion schedule 225 identifies the time for each conversion and what quantity of each step of a factory process is to be processed before each conversion. The conversion schedule 225 is indicative of when at least one machine conversion is to be performed. The conversion schedule 225 maximizes on-time delivery, minimizes a number of conversions, minimizes cycle time and may optimize other KPIs. The conversion schedule 225 may distribute conversions evenly through the given time period. The mathematical programing model may be an MIP optimization model that further models individual machines and models quantity of products processed. One or more outputs of the created conversion schedule 225 includes quantity of product processed for each bottleneck step for each time period on each machine and time spent in each conversion for each time period on each machine. The conversion schedule 225 is indicative of when machine conversions are to be performed in order to fulfil a conversion schedule for each machine of the factory for a time interval. At least one indication of when machine conversions are to be performed includes a time for each conversion and what quantity of each step in the production flow is to be processed before each conversion.

At block 340, the planning and scheduling system 200 creates a lot schedule 235 for the factory by running a simulation that follows the conversion schedule 225. The simulation tool is also applied to the conversion schedule 225 and the bottleneck loading plan 215 to create the lot schedule 235. The lot schedule 235 includes an identification of each machine in the factory and corresponding and start time and finish time for each lot of each machine of the entire factory for the specified time period. The lot schedule 235 includes the amount of each product to process on each tool of the entire factory for the specified time period. The lot schedule 235 may also split a single lot to process simultaneously on more than one machine. This splitting can be controlled using the block-based configuration of the simulation.

At block 350, the planning and scheduling system 200 publishes the lot schedule 235. The lot schedule may be processed either by a dispatching system 240 of the factory or manually by an operator. The lot schedule 235 is indicative of the amount of each product to process on each bottleneck tool for the specified time period for the entire factory.

Next, back-end semiconductor processing is performed in accordance with the lot schedule 235, thereby producing assembled and tested integrated circuit (IC) packages from semiconductor wafers in a more efficient manner.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C#, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, executed in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantageously, the method described herein creates a lot to machine plan and schedule for a semiconductor manufacturing environment. The schedule reduces conversions, may provide on-time delivery, increase overall throughput, decrease cycle time, and other KPIs, etc. for each lot by addressing factory bottlenecks at machines. The lot assignment are scheduled to the machine, or split to multiple machines, based on priority, available resources and other manufacturing constraints. The schedule may be simulated to determine future lot processing. The schedule is monitored in real-time to effect changes therein as deviations appear in the schedule which allow for further optimization. Furthermore, the real-time monitoring of the schedule in selected time buckets allow for further optimization by reviewing high yield and low yield buckets for process improvements. Still further, embodiments of the enable a computer to automatically create a schedule whereas before it could not automatically create a schedule.

While the foregoing is directed to embodiments of the present disclosure, other and further embodiments of the disclosure may be devised without departing from the basic scope thereof, and the scope thereof is determined by the claims that follow.

What is claimed is:

1. A method for improving a factory back-end comprising:
   receiving factory data comprising identification of a bottleneck family comprising at least one semiconductor processing machine of the bottleneck family, and at least one of processing speed, factory route, and conversion information of the at least one semiconductor processing machine;
   receiving production targets comprising a time period comprising at least one week, and a quantity of semiconductor product to be produced on the at least one semiconductor processing machine;
   running a first mathematical programming model comprising one of a mixed integer programming model, a mixed integer quadratic programming model, and a linear programming model, that takes the factory data and the production targets as input, to produce a first solution, and processing the first solution to produce a bottleneck loading plan defining components of the production targets to be produced by the at least one semiconductor processing machine of the bottleneck family during the time period;

running a second mathematical programing model comprising a mixed integer programming model to model semiconductor products processed, applied to the bottleneck loading plan, that produces a second solution comprising a conversion time for a semiconductor processing machine and a quantity of steps in a production flow to be processed before conversion, and processing the second solution to produce a conversion schedule for the at least one machine of the bottleneck machine families;

creating a lot schedule for the factory identifying a start time and a finish time for at least one semiconductor processing machine for each lot processed on the semiconductor processing machine for the time period, and indicating an amount of product to process on the at least one semiconductor processing machine of the bottleneck family for the time period, by running a simulation that follows the conversion schedule; and processing the lot schedule with a dispatch system coupled to the at least one semiconductor processing machine to automatically produce semiconductor products in accordance with the lot schedule.

2. The method of claim 1, wherein the bottleneck loading plan identifies when machine conversions are to be processed.

3. The method of claim 1, wherein the conversion schedule distributes conversions evenly through a selected time period.

4. The method of claim 1, wherein the lot schedule includes at least an identification of each machine in the factory and corresponding start time and finish time for each lot for each time period.

5. The method of claim 1, wherein the second mathematical programing model further models equipment groups or individual pieces of equipment and models quantity of products processed.

6. The method of claim 1, wherein the conversion schedule includes quantity of product processed for each machine of the bottleneck machine families for a specified time period and time spent in each conversion for the specified time period.

7. A non-transitory computer-readable medium containing computer program code that, when executed by a processor, cause the processor to perform a method for improving a factory back end, the method comprising:

receiving factory data comprising identification of a bottleneck family comprising at least one semiconductor processing machine of the bottleneck family, and at least one of processing speed, factory route, and conversion information of the at least one semiconductor processing machine;

receiving production targets comprising a time period comprising at least one week and a quantity of semiconductor product to be produced on the at least one semiconductor processing machine;

running a first mathematical programming model comprising one of a mixed integer programming model, a mixed integer quadratic programming model, and a linear programming model, that takes the factory data and the production targets as input, to produce a first solution, and processing the first solution to produce a bottleneck loading plan defining components of the production targets to be produced by the at least one semiconductor processing machine of the bottleneck family during the time period;

running a second mathematical programing model comprising a mixed integer programming model to model semiconductor products processed, applied to the bottleneck loading plan, that produces a second solution comprising a conversion time for a semiconductor processing machine and a quantity of steps in a production flow to be processed before conversion, and processing the second solution to produce a conversion schedule for the at least one machine of the bottleneck machine families;

creating a lot schedule for the factory identifying a start time and a finish time for at least one semiconductor processing machine for each lot processed on the semiconductor processing machine for the time period, and indicating an amount of product to process on the at least one semiconductor processing machine of the bottleneck family for the time period by running a simulation that follows the conversion schedule; and processing the lot schedule with a dispatch system coupled to the at least one semiconductor processing machine to automatically produce semiconductor products in accordance with the lot schedule.

8. The non-transitory computer-readable medium of claim 7, wherein the bottleneck loading plan identifies when machine conversions are to be processed.

9. The non-transitory computer-readable medium of claim 7, wherein the conversion schedule distributes conversions evenly through a selected time period.

10. The non-transitory computer-readable medium of claim 7, wherein the lot schedule includes at least an identification of each machine in the factory and corresponding start time and finish time for each lot for each time period.

11. The non-transitory computer-readable medium of claim 7, wherein the second mathematical programing model further models equipment groups or individual pieces of equipment and models quantity of products processed.

12. The non-transitory computer-readable medium of claim 7, wherein the conversion schedule includes quantity of product processed for each machine of the bottleneck machine families for a specified time period and time spent in each conversion for the specified time period.

13. A system for improving a factory back end, the system comprising:

at least one processor; and a memory containing a program that, when executed by the at least one processor, cause the system to:

receive factory data comprising identification of a bottleneck family comprising at least one semiconductor processing machine of the bottleneck family, and at least one of processing speed, factory route, and conversion information of the at least one semiconductor processing machine;

receive production targets comprising a time period comprising at least one week and a quantity of semiconductor product to be produced on the at least one semiconductor processing machine;

run a first mathematical programming model comprising one of a mixed integer programming model, a mixed integer quadratic programming model, and a linear programming model, that takes the factory data and the production targets as input, to produce a first solution, and processing the first solution to produce a bottleneck loading plan defining components of the production targets to be produced by the at least one semiconductor processing machine of the bottleneck family during the time period;

run a second mathematical programing model comprising a mixed integer programming model to model semiconductor products processed, applied to the bottleneck loading plan, that produces a second solution comprising a conversion time for a semiconductor processing machine and a quantity of steps in a production flow to be processed before conversion, and processing the second solution to produce a conversion schedule for the at least one machine of the bottleneck machine families;

create a lot schedule for the factory identifying a start time and a finish time for at least one semiconductor processing machine for each lot processed on the semiconductor processing machine for the time period, and indicating an amount of product to process on the at least one semiconductor processing machine of the bottleneck family for the time period by running a simulation that follows the conversion schedule; and process the lot schedule with a dispatch system coupled to the at least one semiconductor processing machine to automatically produce semiconductor products in accordance with the lot schedule.

14. The system of claim 13, wherein the bottleneck loading plan identifies when machine conversions are to be processed.

15. The system of claim 13, wherein the conversion schedule distributes conversions evenly through a selected time period.

16. The system of claim 13, wherein the lot schedule includes at least an identification of each machine in the factory and corresponding start time and finish time for each lot for each time period.

17. The system of claim 13, wherein the second mathematical programing model further models equipment groups or individual pieces of equipment and models quantity of products processed.

* * * * *